(12) United States Patent
Doi

(10) Patent No.: US 7,941,011 B2
(45) Date of Patent: May 10, 2011

(54) MULTILEVEL LIGHT INTENSITY MODULATOR

(75) Inventor: Masaharu Doi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 96 days.

(21) Appl. No.: 12/585,618

(22) Filed: Sep. 18, 2009

(65) Prior Publication Data

US 2010/0014801 A1     Jan. 21, 2010

Related U.S. Application Data

(63) Continuation of application No. PCT/JP2007/056444, filed on Mar. 27, 2007.

(51) Int. Cl.
*G02F 1/01*       (2006.01)
(52) U.S. Cl. ............ 385/3; 385/2; 385/1; 385/5; 385/14
(58) Field of Classification Search .................. 385/1, 2,
385/3, 5, 6, 7, 8, 9, 10, 14, 24, 39, 40, 42,
385/31, 132; 398/82, 183, 186, 210, 214;
359/237, 238
See application file for complete search history.

(56) References Cited

U.S. PATENT DOCUMENTS

| | | | | |
|---|---|---|---|---|
| 6,744,546 | B2 | 6/2004 | Nakamura et al. | 359/237 |
| 7,120,848 | B2 | 10/2006 | Kim et al. | 714/752 |
| 7,286,727 | B2* | 10/2007 | Sugiyama | 385/3 |
| 7,668,409 | B2* | 2/2010 | Sugiyama | 385/3 |
| 2004/0021829 | A1 | 2/2004 | Griffin | 353/30 |
| 2006/0159384 | A1* | 7/2006 | Sugiyama | 385/3 |
| 2008/0260321 | A1* | 10/2008 | Sugiyama | 385/3 |
| 2009/0162014 | A1* | 6/2009 | Shiraishi et al. | 385/45 |
| 2010/0014801 | A1* | 1/2010 | Doi | 385/3 |

FOREIGN PATENT DOCUMENTS

JP    2002-328547     11/2002
JP    2003-258733     9/2003

OTHER PUBLICATIONS

Tran, D.D., et al., "Geometrical and Phasor Representation of Multi-level Amplitude-Phase Modulation Formats and Photonic Transmitter Structures", TENCON 2005 IEEE Region Nov. 21, 2005, pp. 1-5.
International Search Report dated May 15, 2007 in corresponding PCT/JP2007/056444.
International Preliminary Report on Patentability mailed Oct. 29, 2009 in corresponding to International application No. PCT/JP2007/056444.

* cited by examiner

*Primary Examiner* — Brian M Healy
(74) *Attorney, Agent, or Firm* — Staas & Halsey LLP

(57) ABSTRACT

In a multilevel light intensity modulator of the invention, input light is branched into n (n is an integer of 2 or more), and respectively sent to n branching waveguides. On the branching waveguides are respectively provided MZI light modulating sections. The MZI light modulating sections branch the input light into two at a branching ratio different from 0.5:0.5, and respectively output a binary optical signal with a quenching ratio being deteriorated, by on/off driving with a binary electric signal. Then by coupling the light output from the MZI light modulating sections, an optical signal with the light intensity modulated to a $2^n$ value not including the zero level is output. As a result quaternary or higher level light intensity modulation which does not include the zero level, can be realized by a practical configuration using a binary electric signal.

13 Claims, 7 Drawing Sheets

⇩ WHEN DC BIAS IS SHIFTED

MULTILEVEL LIGHT INTENSITY MODULATOR

CROSS-REFERENCE TO RELATED APPLICATION

This application is a continuation of PCT/JP2007/056444, filed on Mar. 27, 2007.

FIELD

The embodiments discussed herein are related to a light intensity modulator used in optical communications, and in particular, a multilevel light intensity modulator that modulates light intensity to a quaternary or higher level, which does not include zero level.

BACKGROUND

Conventionally, in the case where quaternary or higher level light intensity modulation is performed, for example, with regard to a general Mach-Zehnder interferometer (MZI) light intensity modulator 100 as illustrated in FIG. 10, there is a method such that a multilevel intensity-modulated optical signal I(t) is output from an optical waveguide 101 according to a voltage signal V(t), by value multiplexing a level of the voltage signal V(t) applied to an electrode 102 to a quaternary or higher level and driving the electrode 102.

Moreover, in a multilevel light intensity modulation circuit described in Japanese Laid-open Patent Publication No. 2003-258733, there is proposed a technique for realizing multilevel intensity modulation by providing a modulator respectively on a pair of branched waveguides of an MZI optical waveguide, and setting a branching ratio in a branching section of the MZI optical waveguide to 1:2, to thereby change the intensity of an optical signal output from a multiplexing section approximately at a ratio of 0:1:2:3.

However, in the case of the conventional configuration illustrated in FIG. 10, it is generally difficult to value multiplex the level of the voltage signal V(t) provided at a binary level corresponding to "0" and "1" of data to a quaternary or higher level. Moreover, in the case of the MZI light intensity modulator, as illustrated on the left side of FIG. 11, a relation of output light intensity I with respect to applied voltage V (hereinafter, referred to as "electro-optic property") has a nonlinear characteristic, and the voltage signal V(t) applied to the electrode 102 needs to be multiplexed in an unequally-spaced manner in order to realize equally-spaced light intensity modulation. However, this is even more difficult to realize. Furthermore in the case where a DC bias for adjusting an operating point of the MZI light intensity modulator is shifted from an optimum point, for example, as illustrated in FIG. 12, each level of the light intensity largely changes. Therefore there is also the drawback in that this is not practical. In addition, in the case of the MZI light intensity modulator using lithium niobate ($LiNbO_3$) as a substrate material, drift of the operating point occurs due to temperature change or the like. As a measure against this, the DC bias needs to be controlled. However there is also a problem in that it is difficult to apply known control techniques corresponding to binary light intensity modulation, to quaternary or higher level light intensity modulation.

Furthermore in the case of the conventional technique described in Patent Document 1 above, the modulation becomes multilevel light intensity modulation including zero level (quenching state). Therefore, for example, if application to a multilevel modulation method using optical intensity modulation and optical phase modulation in combination is taken into consideration, there is a problem in that phase information cannot be provided when the light intensity is zero level.

SUMMARY

According to an aspect of the invention, a multilevel light intensity modulator includes: a first light intensity modulating section having; a first branching section configured to branch input light into n (n is an integer of 2 or more), n first branching waveguides respectively connected to n branches of the first branching section, and a first coupling section connected to the n first branching waveguides to couple the branched lights; and n second light intensity modulating sections respectively formed on the n first branching waveguides. The n second light intensity modulating sections respectively include; a second branching section configured to branch the first branching waveguide into two, a pair of second branching waveguides respectively connected to two branches of the second branching section, a second coupling section connected to the pair of second branching waveguides to couple the lights, an electrode formed along the pair of second branching waveguides, and a driving section configured to turn on/off the second light intensity modulating section by applying a binary electric signal to the electrode. Moreover at least one of the second branching section and the second coupling section has a preset branching ratio different from a ratio of 0.5:0.5.

In the multilevel light intensity modulator having such a configuration, the light input to the first light intensity modulating section and branched into n by the first branching section is respectively input to the second light intensity modulating section formed on each first branching waveguide. In each second light intensity modulating section, the input light is branched into two by the second branching section and sent to the pair of second branching waveguides, and the binary electric signal is applied to the electrodes along the second branching waveguides, to thereby turn on/off the second light intensity modulating section. An optical signal is then output from the second coupling section. However if at least one of the second branching section and the second coupling section is set to a branching ratio different from 0.5:0.5, a binary optical signal with a quenching ratio being deteriorated such that light of a significant level is output even at the time of OFF, is output from the second coupling section. By coupling the optical signals respectively output from the n second light intensity modulating sections in the first coupling section of the first light intensity modulating section, an optical signal with the light intensity modulated to a $2^n$ value not including the zero level is output from the first coupling section.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereunder is a description of embodiments for carrying out the invention, with reference to the accompanying drawings. The same reference symbols denote the same or equivalent parts throughout all of the drawings.

Figure 1:
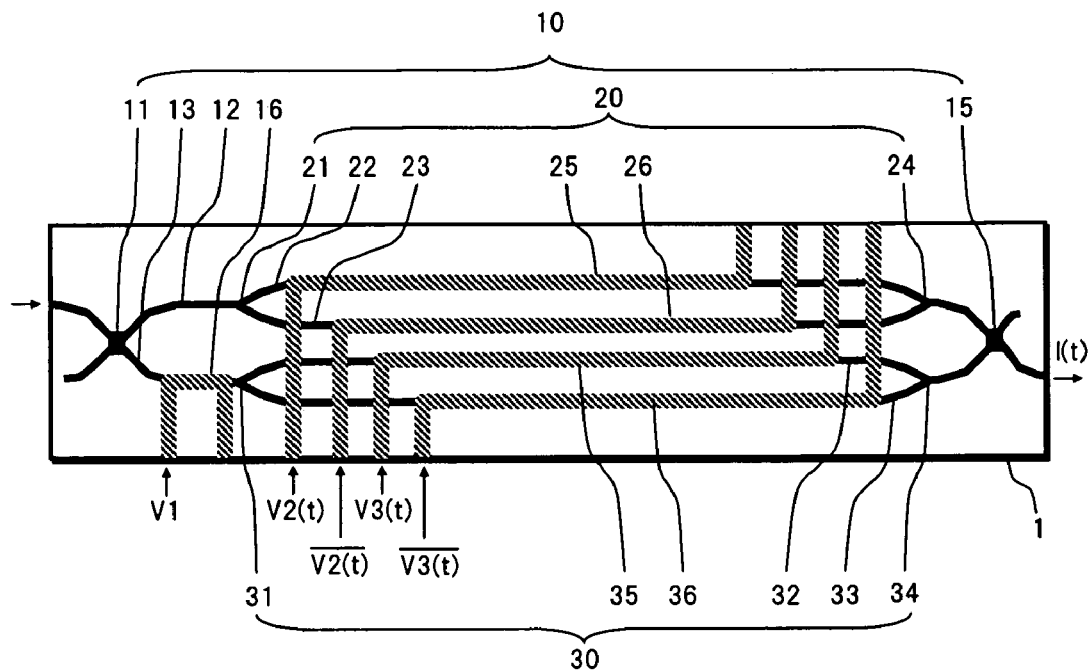
FIG. 1 is a top view illustrating a configuration of a multilevel light intensity modulator according to a first embodiment.

FIG. 1 is a top view illustrating a configuration of a multilevel light intensity modulator according to a first embodiment.

In FIG. 1, the multilevel light intensity modulator of this embodiment has a configuration in which Mach-Zehnder interferometer (MZI) light modulating sections 20 and 30 serving as second light intensity modulating sections are respectively provided on a pair of branching waveguides 12 and 13 of an MZI light modulating section 10 serving as a first light intensity modulating section formed on a substrate 1 of, for example, lithium niobate or the like having an electro-optic effect.

The MZI light modulating section 10 branches input light provided to an input port positioned on one end face of the substrate 1, into two according to a branching ratio of P12:1-P12 (0<P12<1) in a branching section 11, and respectively transmits the branched lights to the pair of branching waveguides 12 and 13. The MZI light modulating section 20 is provided on the branching waveguide 12 on the upper side in the figure, and an electrode 16 with an electric signal V1 output from a driving section (not illustrated in the drawing) applied to one end thereof, and the MZI light modulating section 30 are provided on the branching waveguide 13 on the lower side the figure. The respective lights propagating on the respective branching waveguides 12 and 13 are coupled to one by a coupling section 15 according to a branching ratio of P13:1-P13 (0<P13<1), and output from an output port positioned on the end face on the opposite end of the substrate 1.

Here the branching ratio of P12:1-P12 of the branching section 11, and the branching ratio of P13:1-P13 of the coupling section 15 are designed beforehand so as to be, for example, 0.5:0.5. Moreover the electric signal V1 applied to the electrode 16 is set to a certain voltage level at which a relative phase relation of the light input to the respective MZI light modulating sections 20 and 30 satisfies a condition of reinforcement.

The MZI light modulating section 20 branches the light propagating on the branching waveguide 12 of the MZI light modulating section 10 into two according to a branching ratio of P22:1-P22 (0<P22<1) in a branching section 21, and respectively sends the branched lights to a pair of branching waveguides 22 and 23. Electrodes 25 and 26 are respectively formed on the respective branching waveguides 22 and 23. An electric signal V2($t$) in which a voltage level changes corresponding to binary data output from a driving section (not illustrated in the drawing) is applied to one electrode 25, and an inversion signal $-$V2($t$) of the electric signal V2($t$) is applied to the other electrode 26. Other ends of the respective electrodes 25 and 26 are respectively terminated via resistances (not illustrated in the drawing), to form a traveling-wave type electrode structure. The respective lights propagating on the respective branching waveguides 22 and 23 are coupled to one by a coupling section 24 according to a branching ratio of P23:1-P23, and sent to the coupling section 15 of the MZI light modulating section 10. At least one of the branching ratio P22:1-P22 of the branching section 21 and the branching ratio P23:1-P23 of the coupling section 24 is designed beforehand so as to be a ratio shifted from 0.5:0.5 by a predetermined amount as described later.

The MZI light modulating section 30 branches the light propagating on the branching waveguide 13 of the MZI light modulating section 10 into two according to a branching ratio of P32:1-P32 (0<P32<1) in a branching section 31, and respectively sends the branched lights to a pair of branching waveguides 32 and 33. Electrodes 35 and 36 are respectively formed on the respective branching waveguides 32 and 33. An electric signal V3($t$) in which the voltage level changes corresponding to binary data output from a driving section (not illustrated in the drawing) is applied to one electrode 35, and an inversion signal $-$V3($t$) of the electric signal V3($t$) is applied to the other electrode 36. Other ends of the respective electrodes 35 and 36 are respectively terminated via resistances (not illustrated in the drawing), to form a traveling-wave type electrode structure. The respective lights propagating on the respective branching waveguides 32 and 33 are coupled to one according to a branching ratio of P33:1-P33 by a coupling section 34, and sent to the coupling section 15 of the MZI light modulating section 10. At least one of the branching ratio P32:1-P32 of the branching section 31 and the branching ratio P33:1-P33 of the coupling section 34 is also designed beforehand so as to be a ratio shifted from 0.5:0.5 by a predetermined amount as described later, in the same way as the branching ratio P22:1-P22 of the branching section 21 and the branching ratio P23:1-P23 of the coupling section 24 in the aforementioned MZI light modulating section 20.

Figure 2:
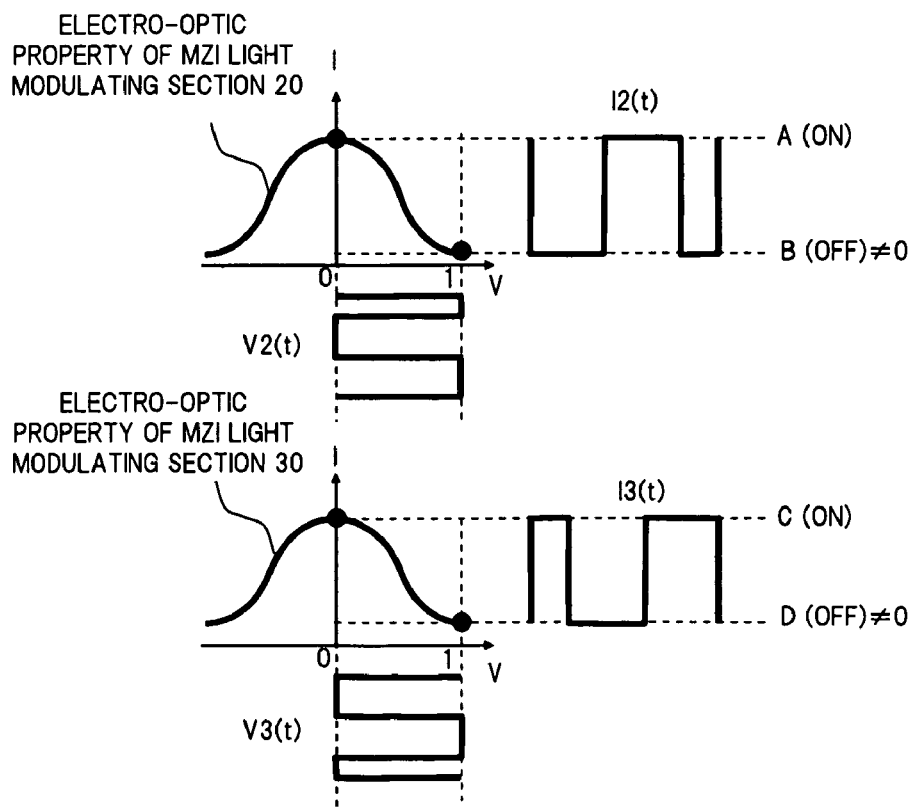
FIG. 2 is a diagram for describing an operation of second and third MZI light modulating sections in the first embodiment.

In the multilevel light intensity modulator having such a configuration, the branching ratio in the respective branching sections 21 and 31 of the MZI light modulating sections 20 and 30, or the branching ratio of the coupling sections 24 and 34 is shifted from 0.5:0.5 by the predetermined amount. As a result, for example as illustrated in FIG. 2, the respective quenching ratios deteriorate at the time of ON/OFF switching of the output light by push-pull driving the respective MZI light modulating sections 20 and 30 by the binary electric signals V2($t$) and V3($t$) and the inversion signals thereof −V2(t) and −V3(t). Accordingly, at the time of OFF when an optical output becomes a quenching state in a normal configuration in which the branching ratio is set to 0.5:0.5, light of a significant level is output from the respective MZI light modulating sections 20 and 30 in the multilevel light intensity modulator.

Here, an intensity of an optical signal output from the MZI light modulating section 20 is expressed by I2(t), and the light intensity I2(t) at the time of ON (V2(t)=0) is designated as A and the light intensity I2(t) at the time of OFF (V2(t)=1) is designated as B. Moreover the intensity of an optical signal output from the MZI light modulating section 30 is expressed by I3(t), and the light intensity I3(t) at the time of ON (V3(t)=0) is designated as C and the light intensity I3(t) at the time of OFF (V3(t)=1) is designated as D. In this case, the intensity I(t) of the optical signal coupled by the coupling section 15 of the MZI light modulating section 10 and output from an output port becomes a level as represented in the following Table 1, corresponding to a combination of the optical output intensities I2(t) and I3(t) of the MZI light modulating sections 20 and 30.

TABLE 1

| I2(t) | A (ON) | A (ON) | B (OFF) | B (OFF) |
|---|---|---|---|---|
| I3(t) | C (ON) | D (OFF) | C (ON) | D (OFF) |
| I(t) | $(\sqrt{A}+\sqrt{C})^2$ | $(\sqrt{A}+\sqrt{D})^2$ | $(\sqrt{B}+\sqrt{C})^2$ | $(\sqrt{B}+\sqrt{D})^2$ |

Specifically, when the optical output intensities I2(t) and I3(t) of the respective MZI light modulating sections 20 and 30 are A and C at the time of both ON, the intensity I(t) of the optical signal output from the output port becomes a square of the sum of optical field intensities $\sqrt{A}$ and $\sqrt{C}$, respectively corresponding to the respective MZI light modulating sections 20 and 30, that is, $I(t)=(\sqrt{A}+\sqrt{C})^2$. Moreover when the optical output intensity I2(t) of the MZI light modulating section 20 is A at the time of ON, and the optical output intensity I3(t) of the MZI light modulating section 30 is D at the time of OFF, the intensity of the optical signal output from the output port becomes $I(t)=(\sqrt{A}+\sqrt{D})^2$. Furthermore when the optical output intensity I2(t) of the MZI light modulating section 20 is B at the time of OFF, and the optical output intensity I3(t) of the MZI light modulating section 30 is C at the time of ON, the intensity of the optical signal output from the output port becomes $I(t)=(\sqrt{B}+\sqrt{C})^2$. Moreover, when the optical output intensities I2(t) and I3(t) of the respective MZI light modulating sections 20 and 30 are B and D at the time of both OFF, the intensity of the optical signal output from the output port becomes $I(t)=(\sqrt{B}+\sqrt{D})^2$.

The above relationship represented in Table 1 is established between the optical output intensities I2(t) and I3(t) of the MZI light modulating sections 20 and 30 and the intensity I(t) of the optical signal output from the output port. Therefore the level ratio of I(t) corresponding to the combination of ON/OFF of I2(t) and I3(t) in Table 1 can be approximately set to 4:3:2:1 by setting the branching ratios of the branching sections 21 and 31, and the coupling sections 24 and 34 of the respective MZI light modulating sections 20 and 30 to an appropriate value, respectively.

Specifically, for example, in the case where: the branching ratio of the branching section 11 in the MZI light modulating section 10 is set to P12:1-P12=0.5:0.5 and the branching ratio of the coupling section 15 is set to P13:1-P13=0.5:0.5; the branching ratio of the branching section 21 in the MZI light modulating section 20 is set to P22:1-P22=0.34:0.66 and the branching ratio of the coupling section 24 is set to P23:1-P23=0.66:0.34; and the branching ratio of the branching section 31 in the MZI light modulating section 30 is set to P32:1-P32=0.17:0.83 and the branching ratio of the coupling section 34 is set to P33:1-P33=0.83:0.17, the intensity I(t) of the optical signal output from the output port achieves a substantially equally-spaced quaternary value of 4.1:2.9:1.7:1.0 by applying the voltage V1 to the electrode 16 to maintain the MZI light modulating section 10 in an ON state, and turning on/off the respective MZI light modulating sections 20 and 30. The following Table 2 represents a correspondence between the ON/OFF state of the respective MZI light modulating sections 10, 20, and 30 and the optical output intensity I(t) in the above setting example.

TABLE 2

| Branching ratio | MZI 10 | MZI 20 | MZI 30 | I(t) |
|---|---|---|---|---|
| P12 = P13 = 0.5 | ON | ON | ON | 4.1 |
| P22 = 0.34 | ON | OFF | ON | 2.9 |
| P23 = 0.66 (=1-P22) | ON | ON | OFF | 1.7 |
| P32 = 0.17 | ON | OFF | OFF | 1.0 |
| P33 = 0.83(=1-P32) | | | | |

Figure 3:
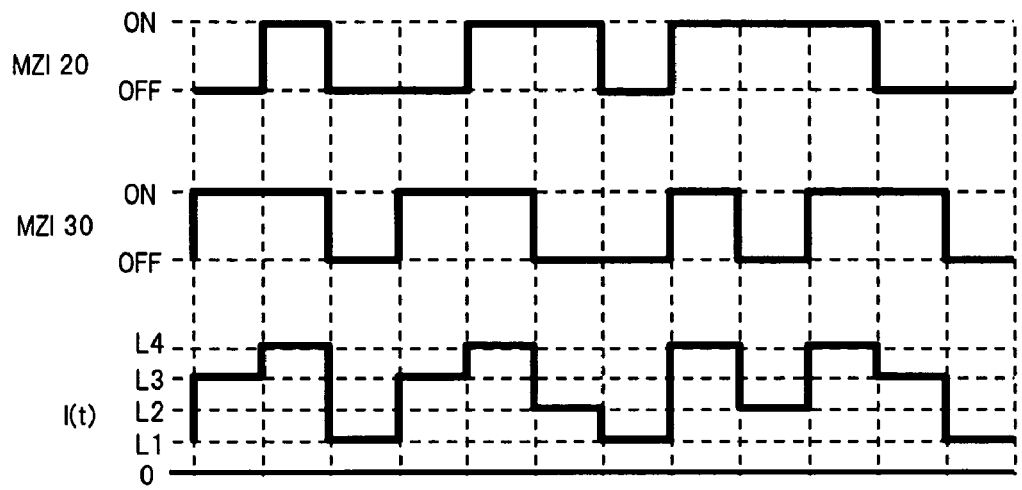
FIG. 3 illustrates one example of an ON/OFF state of the second and third MZI light modulating sections and a level change of an output optical signal intensity in the first embodiment.

Moreover FIG. 3 illustrates one example of an ON/OFF state of the respective MZI light modulating sections 20 and 30, and the level change of the intensity I(t) of the optical signal output from the output port. In this manner, according to the multilevel light intensity modulator, the MZI light modulating sections 20 and 30 are respectively turned on/off by using the binary electric signals V2(t) and V3(t) and the inversion signals −V2(t) and −V3(t) thereof, thereby enabling to realize quaternary light intensity modulation which varies between substantially equally-spaced four output levels L1 to L4 not including the zero level (quenching state).

Figure 4:
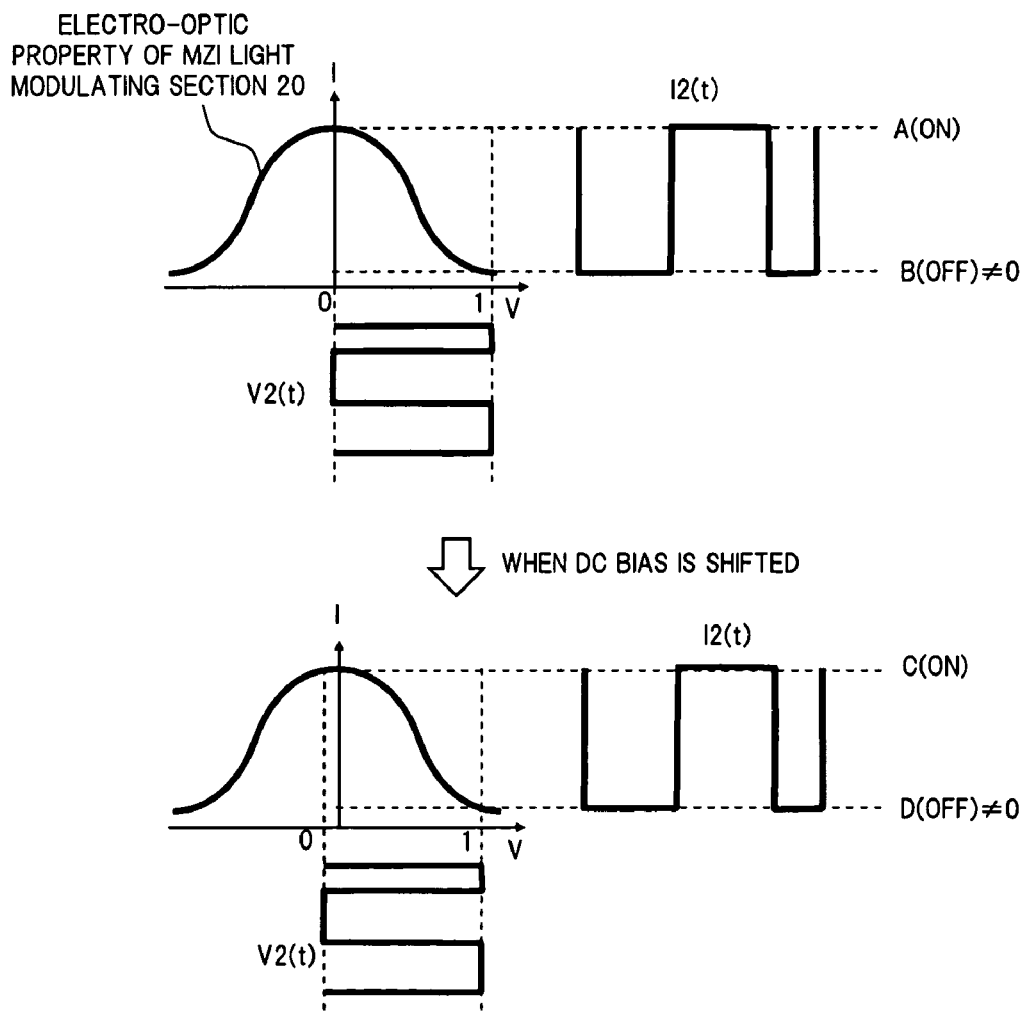
FIG. 4 is a diagram for describing an influence when a DC bias of the second and third MZI light modulating sections is shifted in the first embodiment.

Furthermore the operation of the respective MZI light modulating sections 20 and 30 in the multilevel light intensity modulator is ON/OFF modulation corresponding to "peak" and "valley" of the electro-optic property. Therefore, for example, as illustrated in FIG. 4, even if the DC bias of the MZI light modulating section 20 is shifted from the optimum point, the optical output level I2(t) is hardly effected. FIG. 4 illustrates a case in which the DC bias of the MZI light modulating section 20 is shifted, however, the same also applies to a case in which the DC bias of the MZI light modulating section 30 is shifted. In addition, the MZI light modulating sections 20 and 30 use the normal ON/OFF modulation also for the control of the DC bias with respect to drift of the operating point due to temperature change or the like. Therefore a known control method corresponding to a binary light intensity modulation method can be applied.

In the above first embodiment, a setting example is represented in which the branching ratio of the branching section 11 and the branching ratio of the coupling section 15 in the MZI light modulating section 10 are respectively set to 0.5:0.5. However, the branching ratio of the branching section 11 can also be set shifted from 0.5:0.5. The substantially equally-spaced quaternary light intensity modulation can be realized by optimizing the branching ratio of the branching sections 21 and 31 and the coupling sections 24 and 34 of the MZI light modulating sections 20 and 30 corresponding to the branching ratio of the branching section 11. Moreover in the above example, the light intensity modulation is substantially equally-spaced quaternary modulation, but unequally-spaced quaternary light intensity modulation can also be similarly realized by optimizing the branching ratios of the branching sections 21 and 31 and the coupling sections 24 and 34 of the MZI light modulating sections 20 and 30.

Next is a description of a second embodiment.

Figure 5:
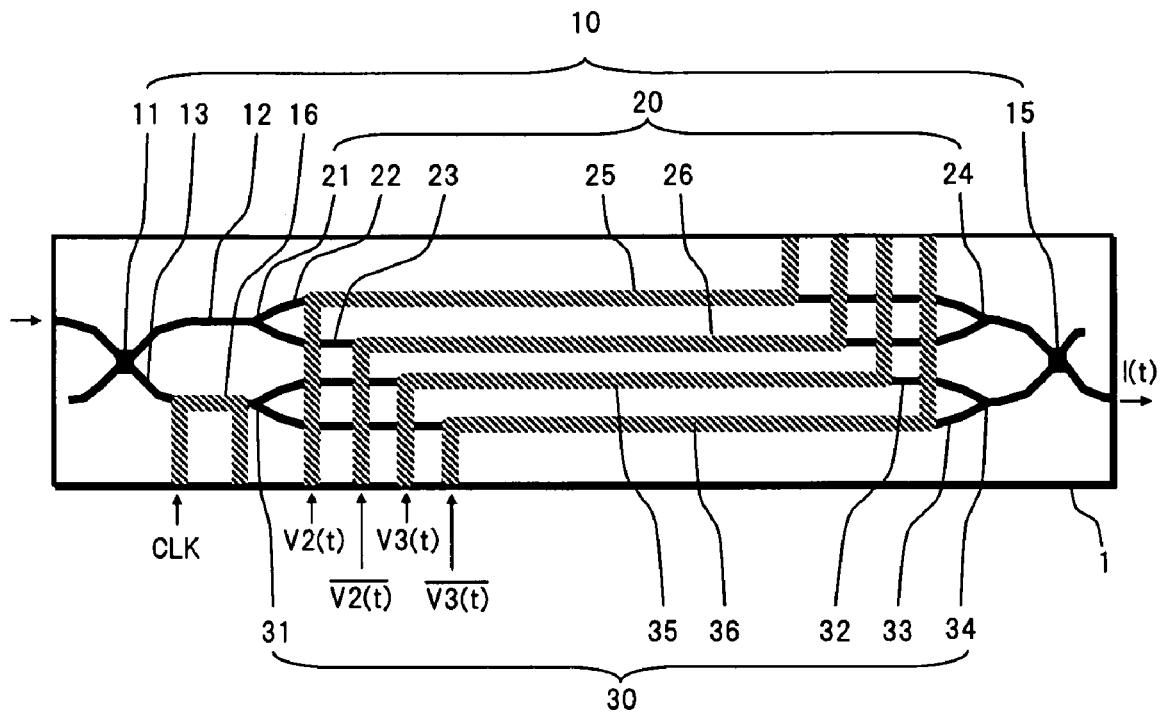
FIG. 5 is a top view illustrating a configuration of a multilevel light intensity modulator according to a second embodiment.

FIG. 5 is a top view illustrating a configuration of a multilevel light intensity modulator according to the second embodiment.

In FIG. 5, the configuration of this embodiment is different from the configuration of the aforementioned first embodiment illustrated in FIG. 1 in that a clock signal CLK having a frequency corresponding to a driving bit rate of the MZI light modulating sections 20 and 30 is applied to the electrode 16 of the MZI light modulating section 10. The configuration other than that described above is the same as for the case of the first embodiment, and hence description thereof is omitted.

Figure 6:
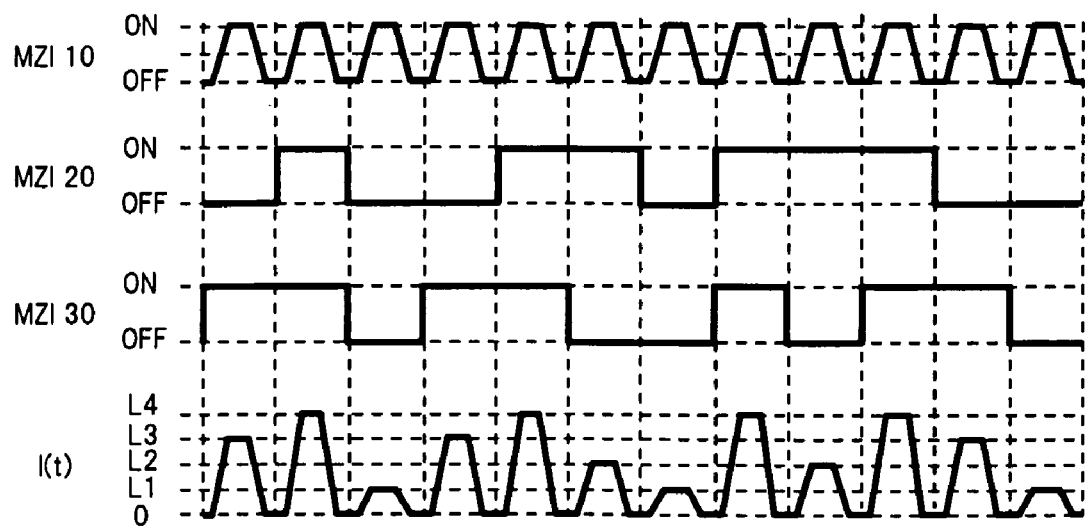
FIG. 6 illustrates one example of an ON/OFF state of each MZI light modulating section and a level change of an output optical signal intensity in the second embodiment.

In the multilevel light intensity modulator having the above configuration, for example, as illustrated in the first stage in FIG. 6, the MZI light modulating section 10 repeats the ON/OFF operation corresponding to a frequency of the clock signal CLK. On the other hand, as illustrated in the second and third stages in FIG. 6, the MZI light modulating sections 20 and 30 are push-pull driven by binary electric signals V2(t) and V3(t) and inversion signals −V2(t) and −V3(t) thereof, and turned on/off in a state with a quenching ratio being deteriorated, in the same manner as for the case of the aforementioned first embodiment. Accordingly, as illustrated in the fourth stage in FIG. 6, the intensity I(t) of the optical signal output from the output port changes between substantially equally-spaced four output levels L1 to L4 not including the zero level, to form a waveform that is return to zero (RZ) pulsed for each bit.

push-pull driven by an electric signal V4(t) and an inversion signal −V4(t) thereof applied to electrodes 45 and 46. Moreover here the electrode 16 of the MZI light modulating section 10 is omitted, and the MZI light modulating section 10 is always operated in the ON state.

Even in the multilevel light intensity modulator having such a configuration, in the same manner as for the case of the aforementioned first embodiment, a branching ratio in respective branching sections 21 to 41 or a branching ratio in respective coupling sections 24 to 44 of the MZI light modulating sections 20 to 40 is shifted from 0.5:0.5 by a predetermined amount. As a result, respective quenching ratios deteriorate when the output light is turned on/off by push-pull driving the respective MZI light modulating sections 20 to 40 with to the binary electric signals V2(t) to V4(t) and the inversion signals −V2(t) to −V4(t) thereof, and light of a significant level is output from the respective MZI light modulating sections 20 to 40 even at the time of OFF. Here however, similarly to the aforementioned case of Table 1, when an intensity of the optical signal output from the MZI light modulating section 40 is expressed by I4(t), and a light intensity I4(t) at the time of ON (V4(t)=0) is designated as E and a light intensity I4(t) at the time of OFF (V4(t)=1) is designated as F, a relationship as represented in the following Table 3 is established between the optical output intensities I2(t) to I4(t) of the respective MZI light modulating sections 20 to 40 and the intensity I(t) of the optical signal output from the output port.

TABLE 3

| I2(t) | A (ON) | A (ON) | A (ON) | A (ON) |
|---|---|---|---|---|
| I3(t) | C (ON) | C (ON) | D (OFF) | D (OFF) |
| I4(t) | E (ON) | F (OFF) | E (ON) | F (OFF) |
| I(t) | $(\sqrt{A}+\sqrt{C}+\sqrt{E})^2$ | $(\sqrt{A}+\sqrt{C}+\sqrt{F})^2$ | $(\sqrt{A}+\sqrt{D}+\sqrt{E})^2$ | $(\sqrt{A}+\sqrt{D}+\sqrt{F})^2$ |
| I2(t) | B (OFF) | B (OFF) | B (OFF) | B (OFF) |
| I3(t) | C (ON) | C (ON) | D (OFF) | D (OFF) |
| I4(t) | E (ON) | F (OFF) | E (ON) | F (OFF) |
| I(t) | $(\sqrt{B}+\sqrt{C}+\sqrt{E})^2$ | $(\sqrt{B}+\sqrt{C}+\sqrt{F})^2$ | $(\sqrt{B}+\sqrt{D}+\sqrt{E})^2$ | $(\sqrt{B}+\sqrt{D}+\sqrt{F})^2$ |

Thus, according to the multilevel light intensity modulator in the second embodiment, the MZI light modulating section 10 is turned on/off according to the clock signal CLK, thereby enabling to also realize RZ multilevel light intensity modulation.

Next is a description of a third embodiment.

Figure 7:
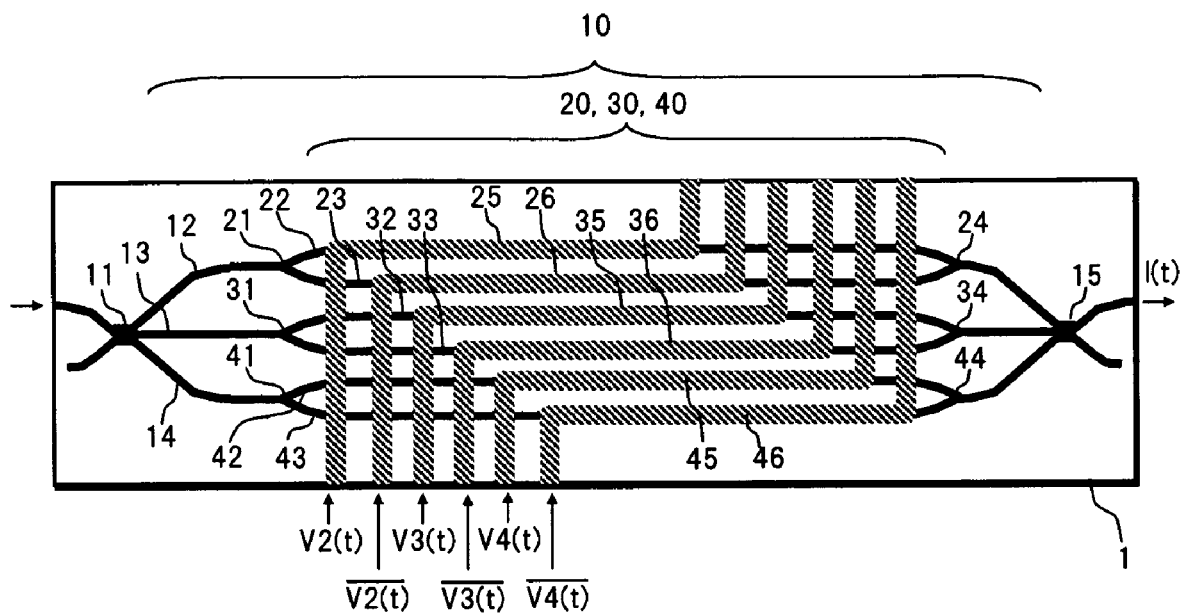
FIG. 7 is a top view illustrating a configuration of a multilevel light intensity modulator according to a third embodiment.

FIG. 7 is a top view illustrating a configuration of a multilevel light intensity modulator according to the third embodiment.

In FIG. 7, in the multilevel light intensity modulator according to this embodiment, in the configuration of the aforementioned first embodiment illustrated in FIG. 1, the light input to the MZI light modulating section 10 is branched into three by the branching section 11 and respectively sent to branching waveguides 12, 13, and 14, and MZI light modulating sections 20 to 40 are respectively provided on the respective branching waveguides 12 to 14, to realize octal light intensity modulation not including the zero level. The MZI light modulating section 40 provided on the branching waveguide 14 has a configuration similar to that of the aforementioned MZI light modulating sections 20 and 30, and is Consequently, by respectively setting the branching ratios of the branching sections 21 to 41 of the respective MZI light modulating sections 20 to 40 to appropriate values, the level ratio of I(t) corresponding to the combination of ON/OFF of I2(t) to I4(t) in Table 3 can be made substantially equally-spaced.

Specifically, for example, in the case where: the branching ratio of the branching section 11 in the MZI light modulating section 10 is set to P12:P13:P14=0.33:0.33:0.33 and the branching ratio of the coupling section 15 is set to P15:P16:P17=0.33:0.33:0.33; the branching ratio of the branching section 21 of the MZI light modulating section 20 is set to P22:1-P22=0.51:0.49 and the branching ratio of the coupling section 24 is set to P23:1-P23=0.49:0.51; the branching ratio of the branching section 31 in the MZI light modulating section 30 is set to P32:1-P32=0.23:0.77 and the branching ratio of the coupling section 34 is set to P33:1-P33=0.77:0.23; and the branching ratio of the branching section 41 in the MZI light modulating section 40 is set to P42:1-P42=0.14:0.86 and the branching ratio of the coupling section 44 is set to P43:1-P43=0.86:0.14, the intensity I(t) of the optical signal output from the output port achieves a substantially equally-spaced octal value of 8.0:6.6:5.8:4.5:3.5:2.6:2.1:1.4 by turning on/off the MZI light modulating sections 20 to 40. The following Table 4 represents a correspondence between the ON/OFF state of the respective MZI light modulating sections 10 to 40 and the optical output intensity I(t) in the above setting example.

TABLE 4

| Branching ratio | MZI 10 | MZI 20 | MZI 30 | MZI 40 | I(t) |
|---|---|---|---|---|---|
| P12 = P13 = P14 = 0.33 | ON | ON | ON | ON | 8.0 |
| P15 = P16 = P17 = 0.33 | ON | ON | ON | OFF | 6.6 |
| P22 = 0.51 | ON | ON | OFF | ON | 5.8 |
| P23 = 0.49 (=1−P22) | ON | ON | OFF | OFF | 4.5 |
| P32 = 0.23 | ON | OFF | ON | ON | 3.5 |
| P33 = 0.77 (=1−P32) | ON | OFF | ON | OFF | 2.6 |
| P42 = 0.14 | ON | OFF | OFF | ON | 2.1 |
| P43 = 0.86 (=1−P42) | ON | OFF | OFF | OFF | 1.4 |

In the above manner, according to the multilevel light intensity modulator in the third embodiment, the MZI light modulating sections 20 to 40 are respectively turned on/off by using the binary electric signals V2(t) to V4(t) and the inversion signals −V2(t) to −V4(t) thereof, thereby enabling to realize substantially equally-spaced octal light intensity modulation not including the zero level (quenching state).

In the above mentioned first to third embodiments, a case in which the MZI light modulating section is respectively provided on the branching waveguides in the MZI light modulating section 10 to perform the quaternary or octal light intensity modulation has been described. However when the present invention is generalized according to a concept similar thereto, the light to be input to the MZI light modulating section 10 is branched into n (n is an integer of 2 or more) by the branching section 11, n MZI light modulating sections are respectively provided on n branching waveguides, on which the light propagates, and at least one of the branching ratio in the respective branching sections and the branching ratio in the respective coupling sections in the n MZI light modulating sections is set shifted from 0.5:0.5 by a predetermined amount, thereby enabling to realize $2^n$ light intensity modulation not including the zero level.

Next is a description of a fourth embodiment.

Figure 8:
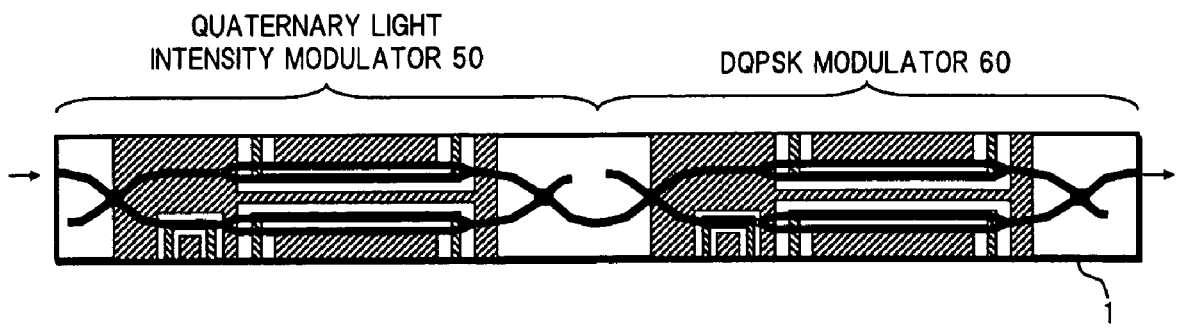
FIG. 8 is a top view illustrating a configuration of an optical modulating section according to a fourth embodiment.

FIG. 8 is a top view illustrating a configuration of an optical modulator according to the fourth embodiment.

In FIG. 8, in an optical modulator in this embodiment, for example, a quaternary light intensity modulator 50, as in the aforementioned first or second embodiment, and a well-known optical phase modulator 60 corresponding to a differential quadrature phase shift keying (DQPSK) modulation format or the like are integrated on the same substrate 1 and cascade-connected.

Figure 9:
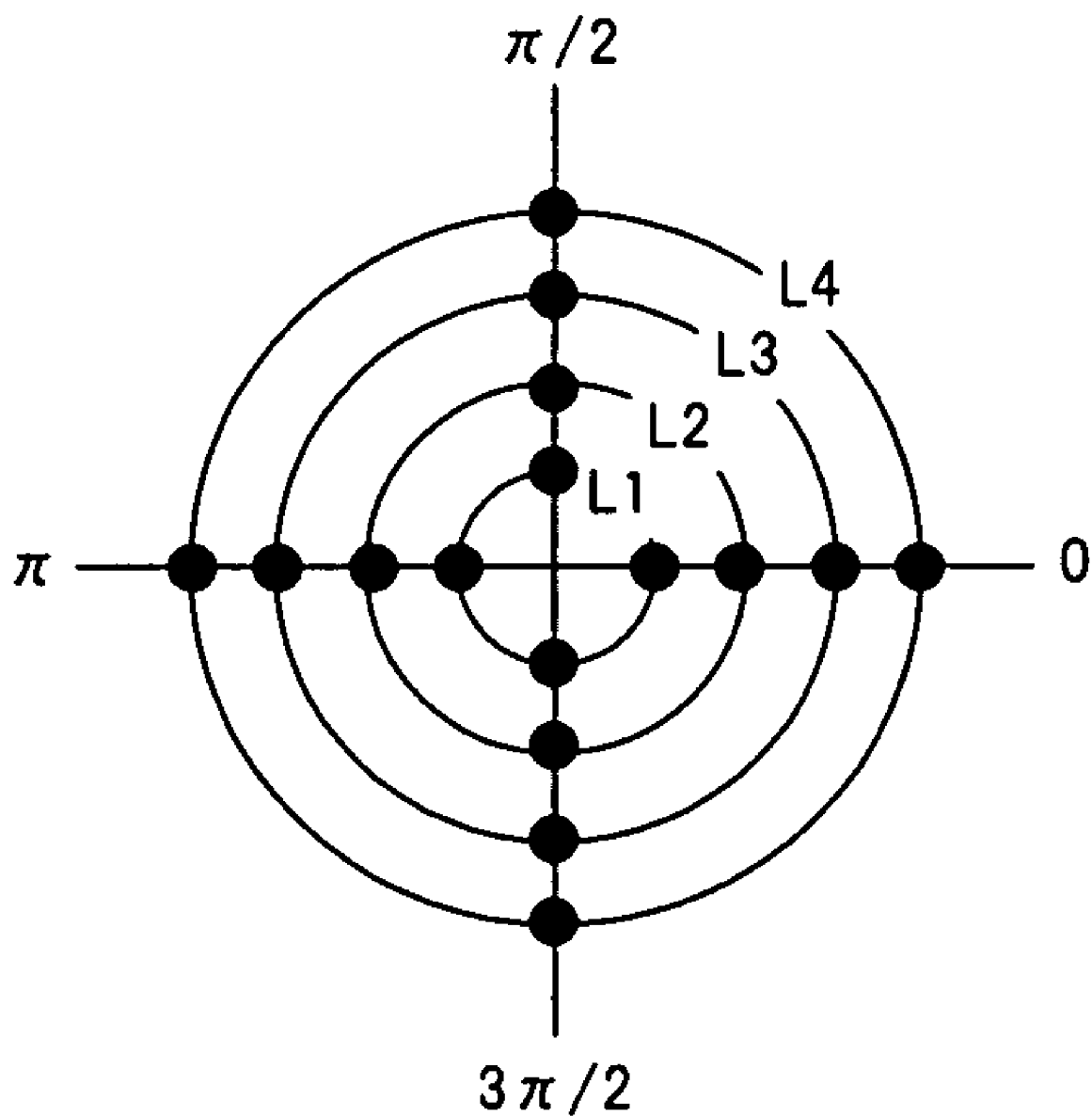
FIG. 9 is a diagram for describing intensity and a phase state of an output optical signal in the fourth embodiment.
Figure 10:
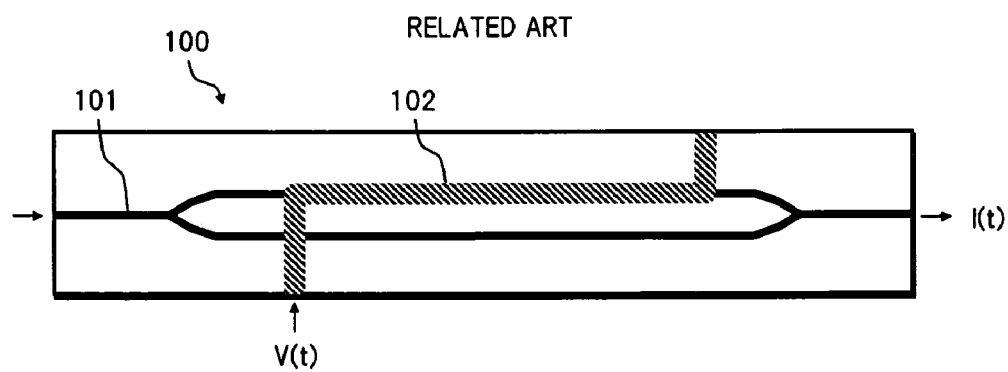
FIG. 10 is a top view illustrating a configuration of a general MZI light intensity modulator.
Figure 11:
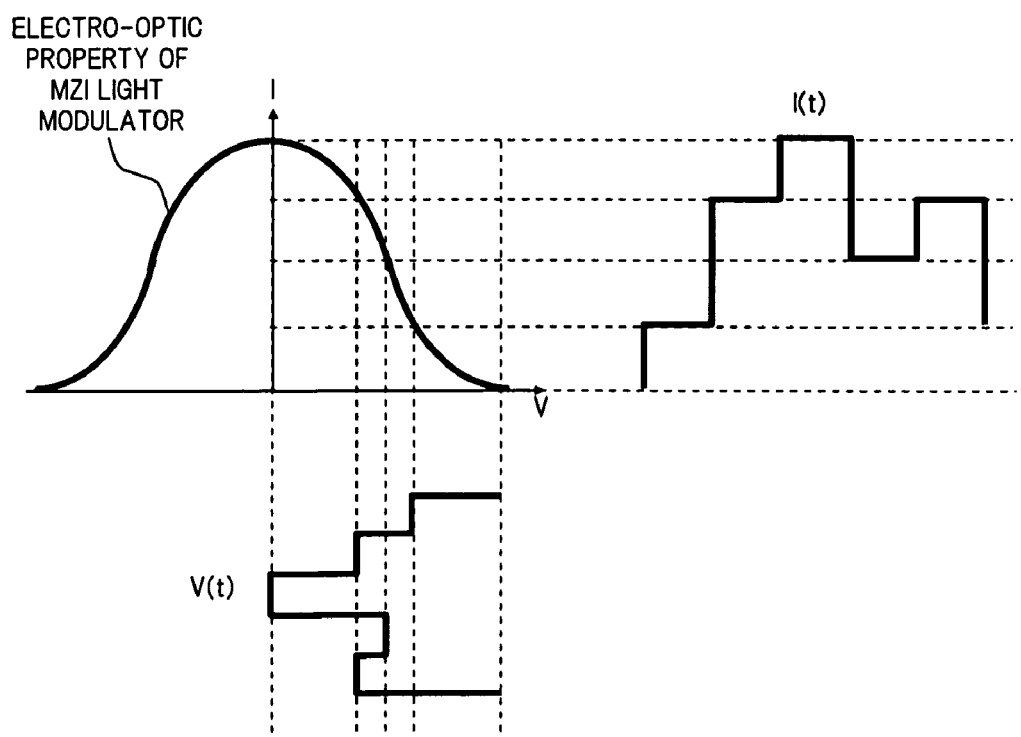
FIG. 11 is a diagram for describing a point of issue when multilevel light intensity modulation is performed by using the MZI light intensity modulator in FIG. 10.
Figure 12:
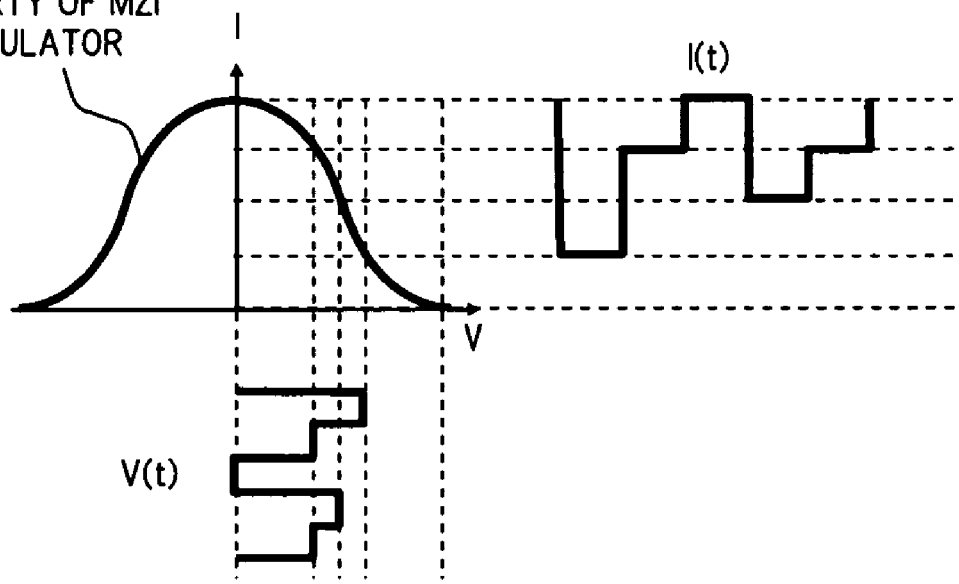
FIG. 12 is a diagram for describing an influence when the DC bias is shifted in a case of performing multilevel light intensity modulation by using the MZI light intensity modulator in FIG. 10.
Figure 12:
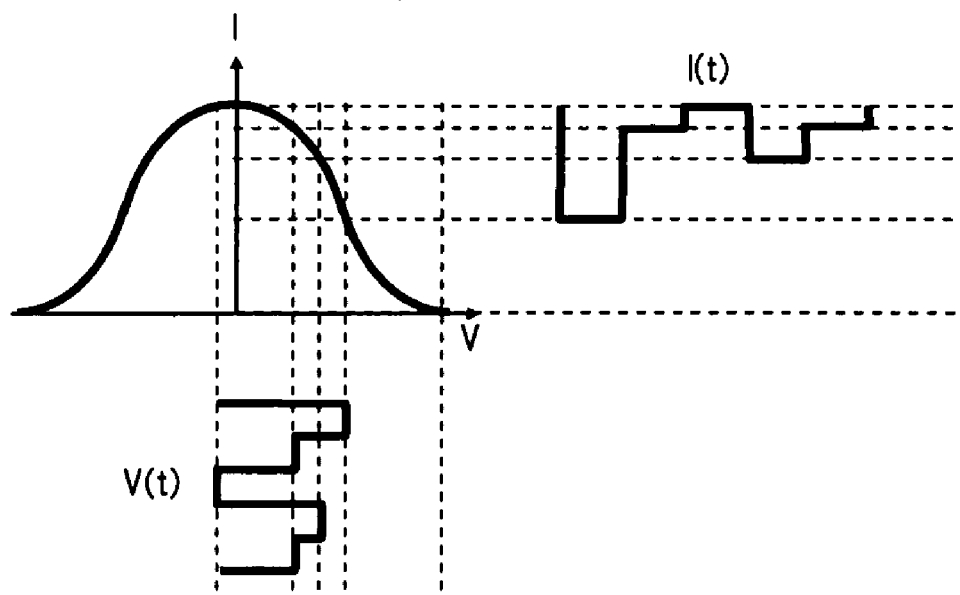

In the optical modulator having such a configuration, an input light is provided to the quaternary light intensity modulator 50, and an optical signal, in which a light intensity changes between substantially equally-spaced four output levels L1 to L4 not including a zero level, is generated in the same manner as for the case of the aforementioned first or second embodiment. Then the optical signal subjected to quaternary light intensity modulation is input to the DQPSK modulator 60 so that the optical signal is subjected to DQPSK modulation with a phase thereof being controlled. As a result, as the optical signal output from the DQPSK modulator 60, as illustrated in FIG. 9, an optical signal subjected to hexadecimal light intensity/phase modulation formed of a combination of quaternary light intensities L1 to L4 and quaternary optical phase differences 0, π/2, π, and 3π/2 can be obtained.

In the abovementioned fourth embodiment, a configuration example in which the quaternary light intensity modulator 50 and the DQPSK modulator 60 are integrated on the same substrate 1 is illustrated. However, for example, the quaternary light intensity modulator 50 and the DQPSK modulator 60 formed separately may be cascade-connected by using an optical fiber or the like. Moreover, one example in which the optical signal that has been light-intensity modulated by the quaternary light intensity modulator 50, is input to the DQPSK modulator 60 to perform DQPSK modulation has been described. However, the optical signal that has been DQPSK-modulated by the DQPSK modulator 60 can be input to the quaternary light intensity modulator 50 to perform light intensity modulation. Furthermore, in the fourth embodiment, the DQPSK modulator is cascade-connected to the quaternary light intensity modulator illustrated in the first or second embodiment. However, the DQPSK modulator can be also cascade-connected to an octal or higher light intensity modulator as illustrated in the aforementioned third embodiment. In addition, the DQPSK modulator is cascade-connected to the multilevel light intensity modulator, but the optical phase modulator that can be cascade-connected is not limited to the one corresponding to the DQPSK modulation format.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A multilevel light intensity modulator comprising:
a first light intensity modulating section having; a first branching section configured to branch input light into n (n is an integer of 2 or more), n first branching waveguides respectively connected to n branches of the first branching section, and a first coupling section connected to the n first branching waveguides to couple the branched lights; and
n second light intensity modulating sections respectively formed on the n first branching waveguides, wherein
the n second light intensity modulating sections respectively comprise;
a second branching section configured to branch the first branching waveguide into two,
a pair of second branching waveguides respectively connected to two branches of the second branching section,
a second coupling section connected to the pair of second branching waveguides to couple the lights,
an electrode formed along the pair of second branching waveguides, and
a driving section configured to turn on/off the second light intensity modulating section by applying a binary electric signal to the electrode,
and at least one of the second branching section and the second coupling section has a preset branching ratio different from a ratio of 0.5:0.5.

2. A multilevel light intensity modulator according to claim 1, wherein
branching ratios of the first branching section and the first coupling section, and the second branching section and the second coupling section are previously set so that respective levels of optical signals that have been light intensity modulated to a $2^n$ value are substantially equally-spaced.

3. A multilevel light intensity modulator according to claim 1, wherein
the first light intensity modulating section, when the value of n is 2, has an electrode formed on at least one portion excluding the second light intensity modulation section on the first branching waveguide, and a driving section that applies an electric signal to the electrode.

4. A multilevel light intensity modulator according to claim 3, wherein
the driving section of the first light intensity modulating section is configured to apply to the electrode, an electric signal that makes a relative phase relation of lights input to the second light intensity modulation sections satisfy a condition of reinforcement.

5. A multilevel light intensity modulator according to claim 3, wherein
the driving section of the first light intensity modulating section is configured to apply to the electrode, a clock signal having a frequency corresponding to a driving bit rate of the second light intensity modulation sections.

6. A multilevel light intensity modulator according to claim 1, wherein
the driving section of the second light intensity modulating sections is configured to apply to the electrode, a DC bias for adjusting an operating point.

7. A multilevel light intensity modulator according to claim 6, wherein
the driving section of the second light intensity modulating sections is configured to control the DC bias depending on a drift of the operating point.

8. A multilevel light intensity modulator according to claim 1, wherein
the driving section of the second light intensity modulating sections is configured to apply a binary electric signal to an electrode formed along one of the pair of second branching waveguides, and to apply an inversion signal of the electric signal to an electrode formed along another of the pair of second branching waveguides, and to push-pull drive the second light intensity modulation section.

9. An optical modulator comprising a multilevel light intensity modulator according to claim 1, and an optical phase modulator that is cascade-connected to the multilevel light intensity modulator.

10. An optical modulator according to claim 9, wherein
the optical phase modulator is an optical phase modulator corresponding to a DQPSK modulation format, and an optical signal that has been light intensity and phase modulated to a $2^n \times 4$ value is output.

11. An optical modulator according to claim 9, wherein
the multilevel light intensity modulator and the optical phase modulator are integrated on a same substrate.

12. An optical modulator according to claim 9, wherein
the multilevel light intensity modulator and the optical phase modulator are cascade-connected via an optical fiber.

13. A multilevel light intensity modulator according to claim 1, wherein
the first light intensity modulating section is configured to output an optical signal with the light intensity modulated to a $2^n$ value not including the zero level, by coupling the optical signals respectively output from the n second light intensity modulating sections in the first coupling section.

* * * * *